(12) United States Patent
Matsumoto et al.

(10) Patent No.: US 11,413,123 B2
(45) Date of Patent: Aug. 16, 2022

(54) MILL BLANK AND DENTAL PROSTHESIS, AND METHODS RESPECTIVELY FOR PRODUCING THESE PRODUCTS

(71) Applicant: KURARAY NORITAKE DENTAL INC., Kurashiki (JP)

(72) Inventors: Atsushi Matsumoto, Aichi (JP); Hiroyuki Sakamoto, Aichi (JP); Yoshihisa Ito, Aichi (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 79 days.

(21) Appl. No.: 16/958,042

(22) PCT Filed: Dec. 26, 2018

(86) PCT No.: PCT/JP2018/047912
§ 371 (c)(1),
(2) Date: Jun. 25, 2020

(87) PCT Pub. No.: WO2019/131787
PCT Pub. Date: Jul. 4, 2019

(65) Prior Publication Data
US 2021/0059797 A1     Mar. 4, 2021

(30) Foreign Application Priority Data
Dec. 26, 2017   (JP) .............................. JP2017-250159

(51) Int. Cl.
*A61C 13/00*     (2006.01)
*A61C 13/083*    (2006.01)

(52) U.S. Cl.
CPC ........ *A61C 13/0022* (2013.01); *A61C 13/083* (2013.01)

(58) Field of Classification Search
CPC .......................... A61C 13/0022; A61C 13/083
USPC ............................................................. 264/16
See application file for complete search history.

(56) References Cited

U.S. PATENT DOCUMENTS

| 4,970,032 A | * | 11/1990 | Rotsaert ............. | A61C 13/0003 264/20 |
| 10,703,076 B2 | * | 7/2020 | Ito .......................... | B32B 18/00 |
| 2013/0069264 A1 | * | 3/2013 | Giordano .......... | A61C 13/0022 264/16 |

(Continued)

FOREIGN PATENT DOCUMENTS

| EP | 0 850 601 A2 | 7/1998 |
| JP | 4-505113 A | 9/1992 |

(Continued)

*Primary Examiner* — Joseph J Hail
*Assistant Examiner* — Shantese L McDonald
(74) *Attorney, Agent, or Firm* — Oblon, McClelland, Maier & Neustadt, L.L.P.

(57) ABSTRACT

The present invention provides a mill blank having a multilayer structure and excellent aesthetics, and a method for producing the mill blank. The present invention relates to a mill blank for dental use comprising a mill blank portion having a multilayer structure with two or more layers, wherein the multilayer structure comprises a body layer (3) inside an enamel layer (1), and the body layer (3) is shaped to comprise a bottom face and a side face, the side face having a portion perpendicular to the bottom face.

20 Claims, 8 Drawing Sheets

(56) References Cited

U.S. PATENT DOCUMENTS

| | | | |
|---|---|---|---|
| 2013/0221554 A1* | 8/2013 | Jung | A61C 13/082 264/16 |
| 2014/0255875 A1* | 9/2014 | Saliger | A61C 5/70 433/203.1 |
| 2014/0356815 A1 | 12/2014 | Spalt et al. | |
| 2015/0238291 A1* | 8/2015 | Hauptmann | A61C 13/0006 428/64.1 |
| 2016/0026222 A1 | 1/2016 | Deng et al. | |
| 2016/0228222 A1 | 8/2016 | Rolf et al. | |
| 2018/0002235 A1 | 1/2018 | Ito et al. | |
| 2019/0380815 A1* | 12/2019 | Aiba | A61K 6/822 |

FOREIGN PATENT DOCUMENTS

| | | |
|---|---|---|
| JP | 2014-534018 A | 12/2014 |
| JP | 2016-535610 A | 11/2016 |
| WO | WO 90/13268 A1 | 11/1990 |
| WO | WO 02/09612 A1 | 2/2002 |
| WO | WO 2009/070470 A1 | 6/2009 |
| WO | WO 2015/051095 A1 | 4/2015 |
| WO | WO 2016/104724 A1 | 6/2016 |

* cited by examiner

MILL BLANK AND DENTAL PROSTHESIS, AND METHODS RESPECTIVELY FOR PRODUCING THESE PRODUCTS

TECHNICAL FIELD

The present invention relates to a mill blank and a method for producing same.

BACKGROUND ART

For years, metal has been used for a range of dental products, including, for example, prostheses (such as veneer crowns, dental caps, crowns, and post crowns), orthodontic products, and products for dental implants. However, metals lack aesthetic quality because of the colors that are distinctively different from the color of natural teeth, and can cause allergic reaction when released from these products. These issues involving the use of metal have been addressed by dental products that use ceramic materials such as aluminum oxide (alumina) and zirconium oxide (zirconia) as alternative materials of metal. Comparatively, zirconia, in particular, has excellent strength and more appealing aesthetics, and this, combined with the current declining prices of zirconia, has created a high demand for this material.

For improved oral aesthetics, a dental product must match the appearance of natural teeth. It is, however, difficult to reproduce the appearance of natural teeth (particularly, transparency and gloss (luster)) with zirconia (sintered body) alone.

Patent Literature 1 discloses a resin-based dental mill blank having layers with curved surfaces.

Patent Literature 2 discloses a blank configured from a dentin-color, low-translucency material forming inside of a block, and an enamel-equivalent, high-translucency material surrounding the low-translucency material.

CITATION LIST

Patent Literature

Patent Literature 1: JP 2016-535610 A
Patent Literature 2: JP 2014-534018 A

SUMMARY OF INVENTION

Technical Problem

A prosthesis fabricated from a mill blank produced by the method of Patent Literature 1 has a structure that looks like kamaboko, and the gradation occurs only from front to back, and vice versa (as a front tooth). Because of this structure, the prosthesis, when used as a front tooth in particular, has low translucency inside the tooth at the left and right edges, and is unable to reproduce the transparency and the shade of the incisal region. This makes the prosthesis of the related art inferior in terms of aesthetics. The prosthesis is also problematic in terms of strength and durability because it is resin-based. The method of this related art also lacks convenience because it involves joining by co-extrusion, sequential extrusion, sequential pressing, or additive buildup.

In Patent Literature 2, the blank material is described as being ceramic or acrylate. However, this related art does not describe a specific method of production, and does not include specific names of ceramics. There is also no description of processes such as calcining and firing.

Accordingly, it is an object of the present invention to provide a mill blank having a multilayer structure and excellent aesthetics, and a method for producing the mill blank.

Solution to Problem

The present inventors conducted intensive studies to find a solution to the foregoing problems, and found that the problems can be solved by employing a specific multilayer structure. The present inventors completed the present invention after further studies conducted on the basis of this finding.

Specifically, the present invention relates to the following.

[1] A mill blank for dental use comprising a mill blank portion having a multilayer structure with two or more layers, wherein the multilayer structure comprises a body layer (3) inside an enamel layer (1), and the body layer (3) is shaped to comprise a bottom face and a side face, the side face having a portion perpendicular to the bottom face.

[2] The mill blank according to [1], wherein the mill blank portion has a quadrangular prism shape.

[3] The mill blank according to [1] or [2], wherein the body layer (3) is shaped so that at least one cross section parallel to the bottom face has an outline that is a combination of at least two selected from the group consisting of an arc, an ellipsoidal arc, a parabola, and a catenary.

[4] The mill blank according to any one of [1] to [3], wherein the body layer (3) is shaped so that at least one cross section perpendicular to the bottom face has a shell shape.

[5] The mill blank according to any one of [1] to [3], wherein the body layer (3) is shaped so that at least one cross section perpendicular to the bottom face has a protruding shape.

[6] The mill blank according to any one of [1] to [5], wherein the mill blank portion comprises at least one intermediate layer (2) between the enamel layer (1) and the body layer (3).

[7] The mill blank according to [6], wherein said at least one intermediate layer (2) is shaped to comprise a bottom face and a side face, and the side face has a portion perpendicular to the bottom face.

[8] The mill blank according to [7], wherein said at least one intermediate layer (2) is shaped so that at least one cross section parallel to the bottom face of said at least one intermediate layer (2) has a cross sectional shape that is a combination of at least two selected from the group consisting of an arc, an ellipsoidal arc, a parabola, and a catenary.

[9] The mill blank according to [7] or [8], wherein said at least one intermediate layer (2) is shaped so that at least one cross section perpendicular to the bottom face of said at least one intermediate layer (2) has a shell shape.

[10] The mill blank according to [7] or [8], wherein said at least one intermediate layer (2) is shaped so that at least one cross section perpendicular to the bottom face of said at least one intermediate layer (2) has a protruding shape.

[11] The mill blank according to any one of [1] to [10], wherein adjacent layers in the multilayer structure have different shades and/or translucencies.

[12] The mill blank according to any one of [1] to [11], wherein the body layer (3) has chromaticity with $L^*$=60 to 85, $a^*$=−2 to 7, and $b^*$=4 to 28 in the $L^*a^*b^*$ color system.

[13] The mill blank according to any one of [1] to [12], wherein the body layer (3) has a translucency $\Delta L^*$ of 2 to 13.

[14] The mill blank according to any one of [1] to [13], wherein the enamel layer (1) has chromaticity with $L^*$=62 to 90, $a^*$=−3 to 5, and $b^*$=3 to 22 in the $L^*a^*b^*$ color system.

[15] The mill blank according to any one of [1] to [14], wherein the enamel layer (1) has a translucency ΔL* of 4 to 20.

[16] The mill blank according to any one of [6] to [15], wherein said at least one intermediate layer (2) has chromaticity with L*=62 to 86, a*=−2 to 7, and b*=4 to 27 in the L*a*b* color system.

[17] The mill blank according to any one of [6] to [16], wherein said at least one intermediate layer (2) has a translucency ΔL* of 4 to 18.

[18] The mill blank according to any one of to [17], wherein the mill blank portion comprises a zirconia pre-sintered body.

[19] A dental prosthesis comprising the mill blank of any one of to [18].

[20] A method for producing the mill blank of any one of [1] to [18], comprising pre-forming of a body layer (3) by powder pressing, and main pressing of the pre-formed body of the body layer (3) with an enamel layer (1) covering the body layer (3).

[21] The method according to [20], comprising forming the body layer (3) into a shape that comprises a bottom face and a side face, and in which the side face has a portion perpendicular to the bottom face, and at least one cross section perpendicular to the bottom face has a shell shape.

[22] A method for producing the mill blank of any one of [6] to [17], comprising pre-forming of a body layer (3) and an intermediate layer (2) by powder pressing, and main pressing of the pre-formed body of the body layer (3) and the intermediate layer (2) with an enamel layer (1) covering the body layer (3) and the intermediate layer (2).

[23] The method according to [22], comprising forming the body layer (3) and/or the intermediate layer (2) into a shape that comprises a bottom face and a side face, and in which the side face has a portion perpendicular to the bottom face, and at least one cross section perpendicular to the bottom face has a shell shape.

[24] A method for producing a dental prosthesis, comprising milling the mill blank of any one of [1] to [18].

Advantageous Effects of Invention

The present invention can provide a mill blank and a dental prosthesis having a multilayer structure and excellent aesthetics, a method for producing the mill blank, and a method for producing the dental prosthesis. Specifically, the present invention can provide a mill blank and a dental prosthesis having a multilayer structure close in shade and translucency to natural teeth, and methods for producing the mill blank and the dental prosthesis. The present invention can also provide a mill blank and a dental prosthesis having a multilayer structure and excellent strength and durability, and methods for producing the mill blank and the dental prosthesis. The methods of the present invention enable production of the mill blank and dental prosthesis in a convenient fashion.

DESCRIPTION OF EMBODIMENTS

A mill blank of the present invention is a mill blank for dental use comprising a mill blank portion having a multilayer structure with two or more layers, wherein the multilayer structure includes a body layer (3) inside an enamel layer (1), and the body layer (3) is shaped to include a bottom face and a side face, the side face having a portion perpendicular to the bottom face.

Mill Blank Portion

Figure 1:
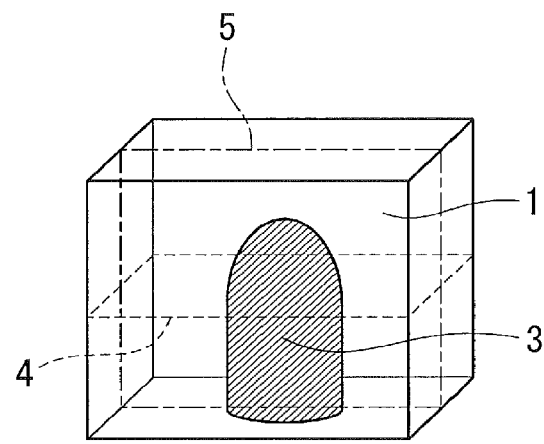
FIG. 1 is a schematic diagram representing an exemplary embodiment of a mill blank portion according to the present invention.
Figure 2A:
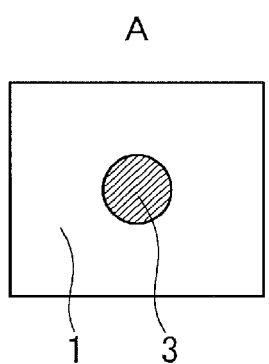
FIG. 2A is a cross sectional view (schematic diagram) of when a mill blank portion of the present invention is cleaved at a first imaginary cutting plane.
Figure 2B:
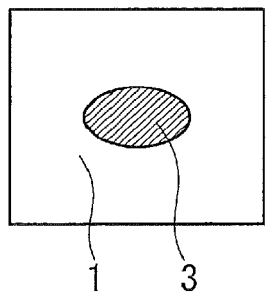
FIG. 2B is a cross sectional view (schematic diagram) of when a mill blank portion of the present invention is cleaved at the first imaginary cutting plane.
Figure 2C:
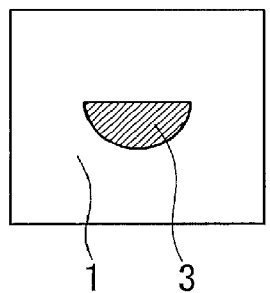
FIG. 2C is a cross sectional view (schematic diagram) of when a mill blank portion of the present invention is cleaved at the first imaginary cutting plane.
Figure 2D:
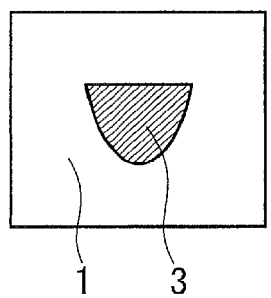
FIG. 2D is a cross sectional view (schematic diagram) of when a mill blank portion of the present invention is cleaved at the first imaginary cutting plane.
Figure 3A:
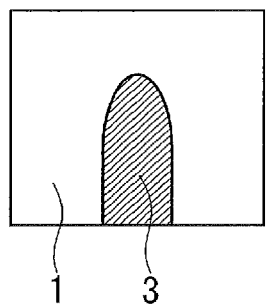
FIG. 3A is a cross sectional view (schematic diagram) of when a mill blank portion of the present invention is cleaved at a second imaginary cutting plane.
Figure 3B:
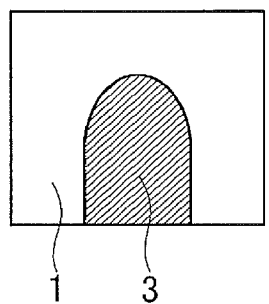
FIG. 3B is a cross sectional view (schematic diagram) of when a mill blank portion of the present invention is cleaved at the second imaginary cutting plane.
Figure 3C:
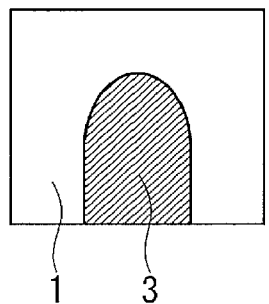
FIG. 3C is a cross sectional view (schematic diagram) of when a mill blank portion of the present invention is cleaved at the second imaginary cutting plane.
Figure 3D:
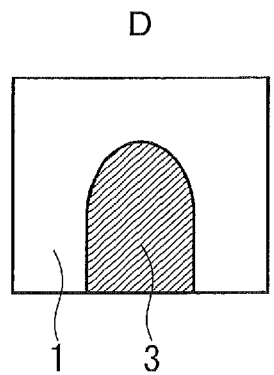
FIG. 3D is a cross sectional view (schematic diagram) of when a mill blank portion of the present invention is cleaved at the second imaginary cutting plane.

In the present invention, the mill blank portion has a multilayer structure with two or more layers including an enamel layer (1) and a body layer (3). FIG. 1 represents an example of the mill blank portion.

The body layer (3) is a layer that has the property to mask the shade of an abutment tooth so as to prevent the shade of the abutment tooth from appearing on the surface of the mill blank, and needs to be formed inside the enamel layer. With the body layer (3) shaped to include a bottom face and a side face, and the side face having a portion perpendicular to the bottom face, the mill blank can have a structure (dentin) that more resemble a natural tooth, providing a shade close to the shade of a natural tooth. The shape with the side face having a portion perpendicular to the bottom face also enables measurement of the structure inside the mill blank portion, allowing it to be reflected in CAD software with ease. That is, the mill blank allows for easy positioning of a dental prosthesis within a virtual mill blank portion using CAD software. In the body layer (3) of the mill blank, the side face has a desired height in a portion perpendicular to the bottom face so that the body layer (3) can more resemble dentin. The bottom face of the body layer (3) may be covered with the enamel layer (1) or with an intermediate layer (2) (described below), or may be exposed at a surface of the mill blank portion.

The preferred shapes of the body layer (3) are described below.

Preferably, the shape of the body layer (3) in at least one cross section parallel to the bottom face has an outline that is a combination of at least two selected from the group consisting of an arc, an ellipsoidal arc, a parabola, and a catenary. The outline may include a straight line in combination with a curve selected from the group consisting of an arc, an ellipsoidal arc, a parabola, and a catenary. However, the outline is more preferably a combination of only curves selected from the group consisting of an arc, an ellipsoidal arc, a parabola, and a catenary. Examples of the shape include circles and ellipsoids, as illustrated in FIGS. 2A to 2D. The cross section includes, for example, a cross section taken by cleaving the mill blank at the first imaginary cutting plane (4) shown in FIG. 1.

Figure 8:
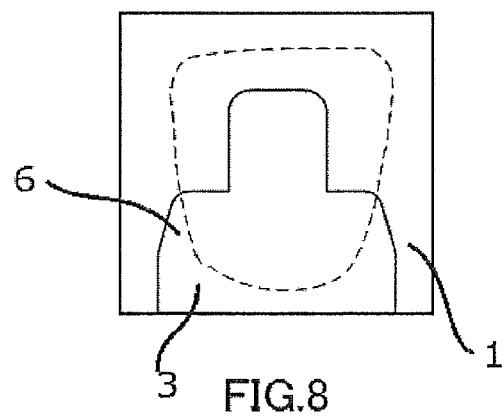
FIG. 8 is a cross sectional view (schematic diagram) of when a mill blank portion of the present invention is cleaved at the second imaginary cutting plane.
Figure 9:
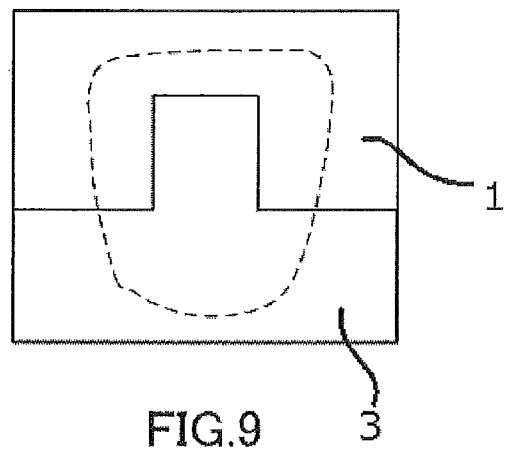
FIG. 9 is a cross sectional view (schematic diagram) of when a mill blank portion of the present invention is cleaved at the second imaginary cutting plane.
Figure 10:
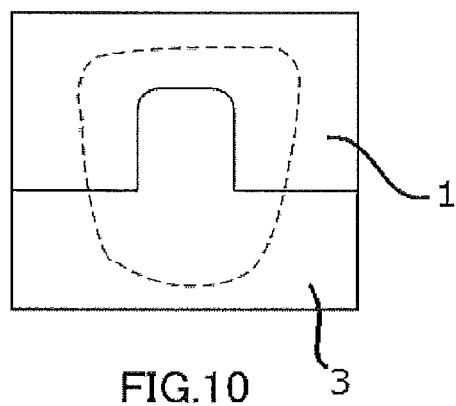
FIG. 10 is a cross sectional view (schematic diagram) of when a mill blank portion of the present invention is cleaved at the second imaginary cutting plane.
Figure 11:
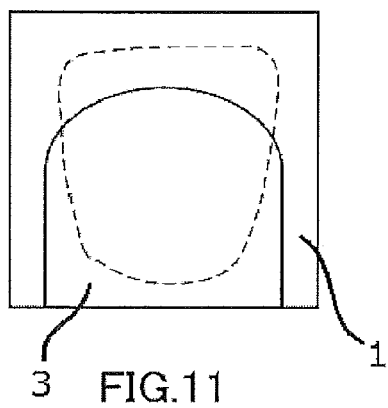
FIG. 11 is a cross sectional view (schematic diagram) of when a mill blank portion of the present invention is cleaved at the second imaginary cutting plane.

Preferably, the body layer (3) has a shell shape in at least one cross section perpendicular to the bottom face. Here, "shell shape" refers to a shape in which, for example, one of the sides of a quadrangle after cutting the mill blank at the second imaginary cutting plane (5) shown in FIG. 1 is curved outward. FIGS. 3A to 3D illustrate examples of such a body layer (3) (the shaded portion in FIG. 3; A to D in FIG. 3 correspond to A to D, respectively, of FIG. 2). The body layer (3) may have the shapes illustrated in FIG. 7 to FIG. 11. For example, the body layer (3) may have a shape with a step (shoulder portion 6), as illustrated in FIG. 7 to FIG. 10. In addition to having a step, the body layer (3) in a cross section cleaved at the second imaginary cutting plane (5) shown in FIG. 1 (at least one cross section perpendicular to the bottom face of the body layer (3)) may have a side face having a plurality of portions perpendicular to the bottom face, forming a protruding shape. In other words, as illustrated in FIG. 7 to FIG. 10, the body layer (3) may partly have a pillar shape, such as a cylinder. As illustrated in FIG. 8 and FIG. 10, the pillar shape in a cross section cleaved at the second imaginary cutting plane (5) shown in FIG. 1 (at least one cross section perpendicular to the bottom face of the body layer (3)) may be a protrusion with round corners. With the body layer (3) shaped in this fashion, the mill blank can more resemble the structure of a natural tooth. The cross section includes, for example, a cross section cleaved at the second imaginary cutting plane (5) shown in FIG. 1.

Figure 4:
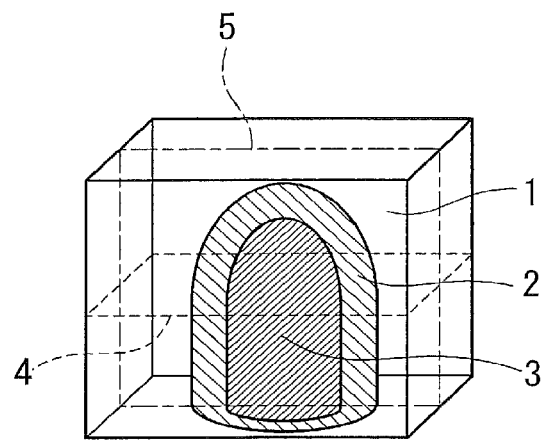
FIG. 4 is a schematic diagram representing an exemplary embodiment of a mill blank portion according to the present invention.
Figure 5A:
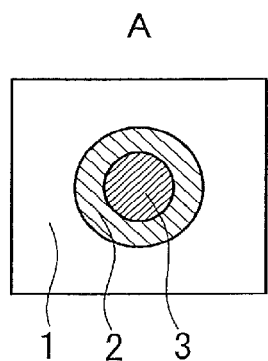
FIG. 5A is a cross sectional view (schematic diagram) of when a mill blank portion of the present invention is cleaved at a first imaginary cutting plane.
Figure 5B:
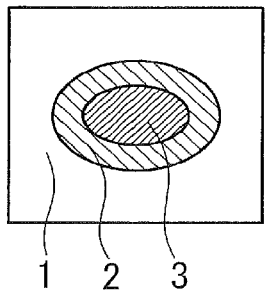
FIG. 5B is a cross sectional view (schematic diagram) of when a mill blank portion of the present invention is cleaved at the first imaginary cutting plane.
Figure 5C:
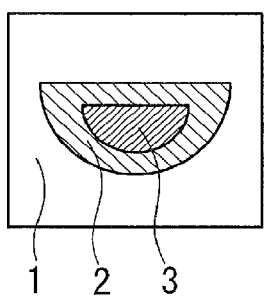
FIG. 5C is a cross sectional view (schematic diagram) of when a mill blank portion of the present invention is cleaved at the first imaginary cutting plane.
Figure 5D:
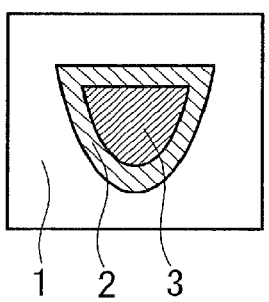
FIG. 5D is a cross sectional view (schematic diagram) of when a mill blank portion of the present invention is cleaved at the first imaginary cutting plane.
Figure 6A:
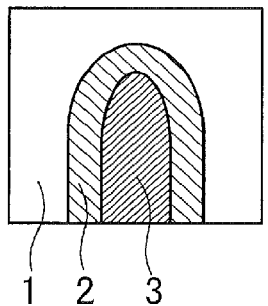
FIG. 6A is a cross sectional view (schematic diagram) of when a mill blank portion of the present invention is cleaved at a second imaginary cutting plane.
Figure 6B:
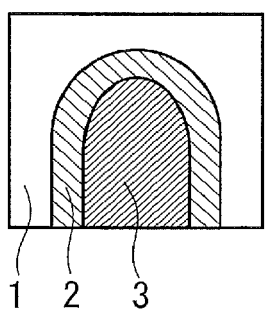
FIG. 6B is a cross sectional view (schematic diagram) of when a mill blank portion of the present invention is cleaved at the second imaginary cutting plane.
Figure 6C:
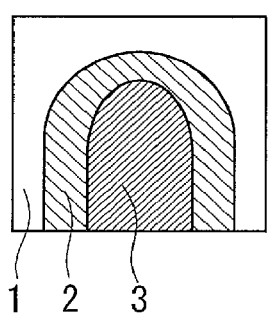
FIG. 6C is a cross sectional view (schematic diagram) of when a mill blank portion of the present invention is cleaved at the second imaginary cutting plane.
Figure 6D:
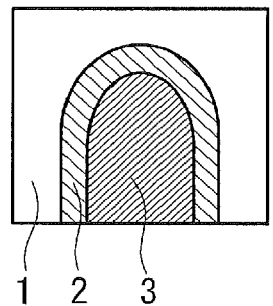
FIG. 6D is a cross sectional view (schematic diagram) of when a mill blank portion of the present invention is cleaved at the second imaginary cutting plane.
Figure 7:
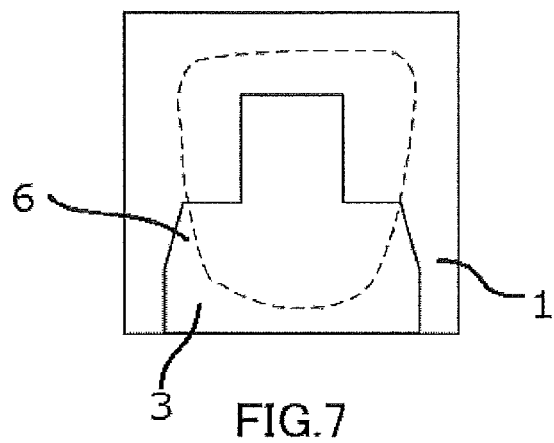
FIG. 7 is a cross sectional view (schematic diagram) of when a mill blank portion of the present invention is cleaved at the second imaginary cutting plane.

In the mill blank of the present invention, the mill blank portion preferably has at least one intermediate layer (2) between the enamel layer (1) and the body layer (3). With at least one intermediate layer (2), the mill blank can prevent the shade of the body layer from appearing on the surface. FIG. 4 illustrates an example of such a mill blank portion.

It is required that the intermediate layer (2) cover at least a part of the side face of the body layer (3). In a preferred embodiment, the intermediate layer (2) entirely covers the side face of the body layer (3). The intermediate layer (2) may also cover the bottom face of the body layer (3), entirely or at least in part.

The preferred shapes of the intermediate layer (2) are described below.

Preferably, the intermediate layer (2) is shaped to include a bottom face and a side face, and the side face has a portion perpendicular to the bottom face. With the intermediate layer (2) shaped in this fashion, the mill blank have a structure (dentin) that more resemble a natural tooth, providing a shade close to the shade of a natural tooth. The shape with the side face having a portion perpendicular to the bottom face also enables measurement of the structure inside the mill blank portion, allowing it to be reflected in CAD software with ease. That is, the mill blank allows for easy positioning of a dental prosthesis within a virtual mill blank portion using CAD software.

Preferably, the shape of the intermediate layer (2) in at least one cross section parallel to the bottom face has an outline that is a combination of at least two selected from the group consisting of an arc, an ellipsoidal arc, a parabola, and a catenary. The outline may include a straight line in combination with a curve selected from the group consisting of an arc, an ellipsoidal arc, a parabola, and a catenary. However, the outline is more preferably a combination of only curves selected from the group consisting of an arc, an ellipsoidal arc, a parabola, and a catenary. Examples of the shape include circles and ellipsoids, as illustrated in FIGS. 5A to 5D. The cross section includes, for example, a cross section taken by cleaving the mill blank at the first imaginary cutting plane (4) shown in FIG. 4.

Preferably, the intermediate layer (2) has a shell shape in at least one cross section perpendicular to the bottom face. FIGS. 6A to 6D represent examples of the intermediate layer (2) having a shell shape (A to D in FIG. 6 correspond to A to D, respectively, of FIG. 5). In another embodiment, at least one intermediate layer (2) may be present inside the enamel layer (1) and outside the body layer (3) of the mill blank portions shown in FIGS. 7, 8, and 11. With the intermediate layer (2) shaped in this fashion, the mill blank can more resemble the structure of a natural tooth. The cross section includes, for example, a cross section cleaved at the second imaginary cutting plane (5) shown in FIG. 4.

The shape of the intermediate layer (2) may or may not be the same as the shape of the body layer (3). In view of masking of an abutment tooth, the intermediate layer (2) preferably has the same shape as the body layer (3).

The shape of the mill blank portion of the present invention is not particularly limited, as long as a jig is attachable. For example, the mill blank may have a prism shape, and the shape is preferably a quadrangular prism in view of production, both in the embodiment comprising the intermediate layer (2) and the embodiment comprising no intermediate layer (2).

A preferred embodiment of the shade and translucency of each layer is described below. In the present invention, for example, the L*, a*, b* chromaticity of the L*a*b* color system may be used as a measure of shade. Translucency may be measured by, for example, the chromaticity ΔL* of the L*a*b* color system. When the mill blank portion of the present invention is a zirconia pre-sintered body as in the embodiment described below, the values of shade (chromaticity) and translucency are values after sintering. The measurement methods will be described in detail in the EXAMPLES section below.

In the body layer (3), the chromaticity in the L*a*b* color system is preferably L*=60 to 85, a*=−2 to 7, b*=4 to 28, more preferably L*=64 to 77, a*=−1 to 4, b*=11 to 27.

The translucency ΔL* of the body layer (3) is preferably 2 to 13, more preferably 2 to 10, even more preferably 3 to 7. With the translucency falling in these ranges, the body layer (3) can improve its color masking properties, and provide a shade close to the shade of a natural tooth.

In the enamel layer (1), the chromaticity in the L*a*b* color system is preferably L*=62 to 90, a*=−3 to 5, b*=3 to 22, more preferably L*=62 to 72, a*=−2 to 2, b*=5 to 19, even more preferably L*=68 to 72, a*=−2 to 2, b*=5 to 19.

The translucency ΔL* of the enamel layer (1) is preferably 4 to 20, more preferably 7 to 20. In certain embodiments, the translucency ΔL* of the enamel layer (1) is more preferably 4 to 18, even more preferably 7 to 18, particularly preferably 8 to 16. With the translucency falling in these ranges, the mill blank portion can have improved aesthetics.

In the intermediate layer (2), the chromaticity in the L*a*b* color system is preferably L*=62 to 86, a*=−2 to 7, b*=4 to 27, more preferably L*=63 to 76, a*=−1 to 4, b*=10 to 26.

The translucency ΔL* of the intermediate layer (2) is preferably 4 to 18, more preferably 5 to 17, even more preferably 6 to 11. With the translucency falling in these ranges, the intermediate layer (2) can allow the body layer (3) to appear in a moderate shade.

In view of producing a more natural appearance, it is preferable in the mill blank portion of the present invention that the adjacent layers of the multilayer structure have different shades and/or translucencies. For example, in an embodiment (x-1) with no intermediate layer (2) as in FIG. 1, it is preferable in view of a more natural appearance that the mill blank portion have translucencies that satisfy the following relationship: translucency ΔL* of body layer (3)<translucency ΔL* of enamel layer (1). In another preferred embodiment (x-2), the difference between the translucency ΔL* of the enamel layer (1) and the translucency ΔL* of the body layer (3) in embodiment (x-1) is preferably 1 to 9, more preferably 2 to 8, even more preferably 3 to 7. In another preferred embodiment (x-3), it is preferable in view of a more natural appearance that the mill blank of embodiment (x-1) satisfy the following relationship: L*, a*, and b* values of enamel layer (1)<L*, a*, and b* values of body layer (3).

In an embodiment (y-1) with the intermediate layer (2) provided in addition to the enamel layer (1) and the body layer (3) as in FIG. 4, it is preferable in view of a more natural appearance that the mill blank have translucencies that satisfy the following relationship: translucency ΔL* of body layer (3)<translucency ΔL* of intermediate layer (2)<translucency ΔL* of enamel layer (1). In another preferred embodiment (y-2), it is preferable in view of a more natural appearance that the mill blank of embodiment (y-1) satisfy the following relationship: L*, a*, and b* values of enamel layer (1)<L*, a*, and b* values of body layer (3). In yet another preferred embodiment (y-3), it is preferable in view of a more natural appearance that the mill blank of embodiment (y-1) or (y-2) satisfy the following relationship: L*, a*, and b* values of enamel layer (1)<L*, a*, and b* values of intermediate layer (2). In another preferred embodiment (y-4), it is preferable in view of a more natural appearance that the mill blanks of embodiments (y-1) to (y-3) have L* values that satisfy the following relationship: L* value of enamel layer (1)<L* value of body layer (3)<L* value of intermediate layer (2). In yet another preferred embodiment (y-5), it is particularly preferable in view of a more natural appearance that the mill blanks of embodiments (y-1) to (y-4) have L* values that satisfy the following relationship: L* value of enamel layer (1)<L* value of body layer (3)<L* value of intermediate layer (2); a* values that satisfy the following relationship: a* value of enamel layer (1)<a* value of intermediate layer (2)<a* value of body layer (3); b* values that satisfy the following relationship: b* value of enamel layer (1)<b* value of intermediate layer (2)<b* value of body layer (3); and translucencies that satisfy the following relationship: translucency ΔL* of body layer (3)<translucency ΔL* of intermediate layer (2)<translucency ΔL* of enamel layer (1). In embodiments (y-1) to (y-5), the difference between the translucency ΔL* of enamel layer (1) and the translucency ΔL* of intermediate layer (2) is preferably 1 to 9, more preferably 2 to 8, even more preferably 3 to 7. In embodiments (y-1) to (y-5), the difference between the translucency ΔL* of intermediate layer (2) and the translucency ΔL* of body layer (3) is preferably 1 to 9, more preferably 2 to 8, even more preferably 3 to 7.

The mill blank portion of the present invention may comprise ceramics such as zirconia and glass, or may comprise resin. However, in view of strength and durability, the mill blank portion of the present invention preferably comprises zirconia. In view of workability, the mill blank portion of the present invention more preferably comprises a zirconia pre-sintered body.

Preferably, the zirconia pre-sintered body comprises a pigment and an additive, in order to satisfy the shade and translucency suited for the layers.

The pigment may be, for example, a known pigment used for dental compositions (e.g., inorganic pigments, complex pigments, fluorescent pigments). Examples of the inorganic pigments include oxides such as nickel oxide, red iron oxide, chromium oxide, aluminum oxide, and titanium oxide. Examples of the complex pigments include Zr—V, Fe(Fe, Cr)$_2$O$_4$, (Ni,Co,Fe)(Fe,Cr)$_2$O$_4$.ZrSiO$_4$, and (Co,Zn)Al$_2$O$_4$. Examples of the fluorescent pigments include Y$_2$SiO$_5$:Ce, Y$_2$SiO$_5$:Tb, (Y,Gd,Eu)BO$_3$, Y$_2$O$_3$:Eu, YAG:Ce, ZnGa$_2$O$_4$:Zn, and BaMgAl$_{10}$O$_{17}$:Eu.

Preferably, the zirconia pre-sintered body comprises a stabilizer because the zirconia pre-sintered body, as a dental product, requires the levels of chipping resistance, crack resistance, and bend strength sufficient to withstand repeated mastication. Specifically, it is preferable to add a stabilizer to zirconia before firing. In this way, a zirconia sintered body, which turns into the base material of a dental product after firing, can have a matrix phase that is at least one of partially stabilized zirconia and fully stabilized zirconia. In the zirconia sintered body, the primary crystalline phase of zirconia is at least one of tetragonal crystal and cubical crystal. The primary crystalline phase of zirconia may comprise both tetragonal crystal and cubical crystal. Preferably, the zirconia sintered body is essentially free of monoclinic crystals. Here, "essentially free of monoclinic crystals" means that the zirconia sintered body has a monoclinic crystal content of less than 5.0 mass %, preferably less than 1.0 mass %. As is known, partially stabilized zirconia (PSZ) refers to zirconia that is partially stabilized by addition of a stabilizer, and fully stabilized zirconia refers to zirconia fully stabilized with a stabilizer.

Preferably, the stabilizer is at least one oxide selected from the group consisting of yttrium oxide ($Y_2O_3$; hereinafter, "yttria"), titanium oxide ($TiO_2$), calcium oxide (calcia; CaO), magnesium oxide (magnesia; MgO), cerium oxide (ceria; $CeO_2$), aluminum oxide (alumina; $Al_2O_3$), scandium oxide ($Sc_2O_3$), lanthanum oxide ($La_2O_3$), erbium oxide ($Er_2O_3$), praseodymium oxide ($Pr_6O_{11}$), samarium oxide ($Sm_2O_3$), europium oxide ($Eu_2O_3$), and thulium oxide ($Tm_2O_3$). In view of high translucency and improved strength, the stabilizer is preferably yttria. These may be used alone, or two or more thereof may be used in combination.

When the stabilizer is containing yttria, the yttria content is preferably 2 to 8 mol %, more preferably 3 to 6 mol % of total 100 mol % of zirconia and stabilizer. With these yttria contents, it is possible to inhibit a phase transformation to monoclinic crystals, and increase the transparency of the zirconia sintered body.

When titanium oxide is contained as a stabilizer, the titanium oxide content is preferably 0.1 to 1 mol %, more preferably 0.1 to 0.3 mol % of total 100 mol % of zirconia and stabilizer.

When calcium oxide is contained as a stabilizer, the calcium oxide content is preferably 2 to 15 mol %, more preferably 2.1 to 12 mol % of total 100 mol % of zirconia and stabilizer.

When magnesium oxide is contained as a stabilizer, the magnesium oxide content is preferably 2 to 12 mol %, more preferably 2.1 to 10 mol % of total 100 mol % of zirconia and stabilizer.

When cerium oxide is contained as a stabilizer, the cerium oxide content is preferably 2 to 18 mol %, more preferably 2.1 to 12 mol % of total 100 mol % of zirconia and stabilizer.

When aluminum oxide is contained as a stabilizer, the aluminum oxide content is preferably 0.1 to 1 mol %, more preferably 0.1 to 0.3 mol % of total 100 mol % of zirconia and stabilizer.

When scandium oxide is contained as a stabilizer, the scandium oxide content is preferably 0.1 to 1 mol %, more preferably 0.1 to 0.3 mol % of total 100 mol % of zirconia and stabilizer.

When lanthanum oxide is contained as a stabilizer, the lanthanum oxide content is preferably 1 to 10 mol %, more preferably 2 to 7 mol % of total 100 mol % of zirconia and stabilizer.

When erbium oxide is contained as a stabilizer, the erbium oxide content is preferably 0.1 to 1 mol %, more preferably 0.1 to 0.3 mol % of total 100 mol % of zirconia and stabilizer.

When praseodymium oxide is contained as a stabilizer, the praseodymium oxide content is preferably 0.1 to 1 mol %, more preferably 0.1 to 0.3 mol % of total 100 mol % of zirconia and stabilizer.

When samarium oxide is contained as a stabilizer, the samarium oxide content is preferably 0.1 to 1 mol %, more preferably 0.1 to 0.3 mol % of total 100 mol % of zirconia and stabilizer.

When europium oxide is contained as a stabilizer, the europium oxide content is preferably 0.1 to 1 mol %, more preferably 0.1 to 0.3 mol % of total 100 mol % of zirconia and stabilizer.

When thulium oxide is contained as a stabilizer, the thulium oxide content is preferably 0.1 to 1 mol %, more preferably 0.1 to 0.3 mol % of total 100 mol % of zirconia and stabilizer.

The content of the stabilizer in the zirconia sintered body can be measured using techniques, for example, such as inductively coupled plasma (ICP) emission spectral analysis, and x-ray fluorescence analysis.

The following describes a method for producing a mill blank of the present invention.

A method for producing a mill blank of the present invention comprises pre-forming of a body layer (3) by powder pressing, and main pressing of the pre-formed body of the body layer (3) with an enamel layer (1) covering the body layer (3).

Here, the powder pressing is a method by which a powder for forming a layer of interest (for example, a zirconia powder in the case of the body layer (3)), and a powder containing components such as pigments and additives are prepared, and pressed in a die with a punch.

In pre-forming, the pressure may be applied by following known conditions. However, the pressure needs to be lower than the pressure of the subsequent main pressing. The density of the body (mill blank portion) obtained is preferably 2.0 to 4.0 $g/cm^3$. The devices and conditions used for main pressing are not limited, as long as the density falls in this range.

When the mill blank portion comprises an intermediate layer (2), it is preferable in the present invention that the method comprises pre-forming of a body layer (3) and an intermediate layer (2) by powder pressing, and main pressing of the pre-formed body of the body layer (3) and the intermediate layer (2) with an enamel layer (1) covering the body layer (3) and the intermediate layer (2). More preferably, the method comprises pre-forming of a body layer (3) by powder pressing, pre-forming of the body layer (3) with an intermediate layer (2) covering the body layer (3), and main pressing of the pre-formed body of the body layer (3) and the intermediate layer (2) with an enamel layer (1) covering the body layer (3) and the intermediate layer (2).

The pressure for the pre-forming of the body layer (3) needs to be lower than the pressure for the pre-forming of the intermediate layer (2), and the pressure for the pre-forming of the intermediate layer (2) needs to be lower than the pressure of the subsequent main pressing.

The density of the body (mill blank portion) obtained is preferably 2.0 to 4.0 $g/cm^3$. The devices and conditions used for main pressing are not limited, as long as the density falls in this range.

In a mill blank portion of the present invention, a body layer (3) of a specific shape may be obtained by pressing and pre-forming the body layer (3) with a die having the specific shape, or by grinding a pre-formed body of body layer (3) into the specific shape after pressing the body layer (3) with an ordinary die. Preferably, the body layer (3) is shaped to include a bottom face and a side face, and the side face has a portion perpendicular to the bottom face, and at least one cross section perpendicular to the bottom face of the body layer (3) has a shell shape, as discussed above. Preferably, the method for producing a mill blank of the present invention comprises forming the body layer (3) into such a shape.

Similarly, an intermediate layer (2) of a specific shape may be obtained by pressing and pre-forming the intermediate layer (2) with a die having the specific shape, or by grinding a pre-formed body of intermediate layer (2) into the specific shape after pressing the intermediate layer (2) with an ordinary die. Preferably, the intermediate layer (2) is shaped to include a bottom face and a side face, and the side face has a portion perpendicular to the bottom face, and at least one cross section perpendicular to the bottom face of the intermediate layer (2) has a shell shape, as discussed above. Preferably, the method for producing a mill blank of the present invention comprises forming the intermediate layer (2) into such a shape.

Mill Blank

A mill blank of the present invention comprises the mill blank portion, preferably with a support unit. The mill blank can be secured to a milling machine with the support unit. The method used to attach the support unit to the mill blank portion is not particularly limited. For example, an adhesive may be used to bond the mill blank portion and the support unit to each other.

A mill blank of the present invention has dental use, and can be suitably used for, for example, milling for fabrication of dental prostheses such as inlays, onlays, veneers, crowns, bridges, abutment teeth, dental posts, dentures, denture bases, and implant parts (fixtures, abutments) using a dental CAD/CAM system. A method for the production of a dental prosthesis from a mill blank of the present invention is not particularly limited, and a known method may be used as appropriate. It is, however, preferable that the method comprises milling of the mill blank.

The present invention encompasses combinations of the foregoing features, provided that such combinations made in various forms within the technical idea of the present invention can produce the effects of the present invention.

EXAMPLES

The following describes the present invention in greater detail by way of Examples. It should be noted, however, that the present invention is in no way limited by the following Examples, and various changes may be made by a person with ordinary skill in the art within the technical idea of the present invention.

Example 1

A zirconia powder was prepared that contained 6 mol % yttria as a stabilizer. The zirconia powder was filled into a cylindrical die of about 11 mm diameter with pigments in such an amount that the body layer (3) has a height of 8 mm after pressing. The pigments were used in the amounts shown in Table 1. For pre-forming, the zirconia powder was pressed at 3 kN, and the resulting pre-formed body of body layer (3) was ground into a shell shape, as illustrated in FIG. 4. The pre-formed body of body layer (3) was then placed in a cylindrical die of about 14 mm diameter, and the same zirconia powder used for body layer (3) was laid around the pre-formed body of body layer (3) with pigments in such an amount that the intermediate layer (2) has a height of 12 mm after pressing. The pigments were used in the amounts shown in Table 1. For pre-forming, the zirconia powder was pressed at 5 kN, and the resulting pre-formed body of body layer (3) and intermediate layer (2) was ground into a shell shape, as illustrated in FIG. 4. The pre-formed body of body layer (3) and intermediate layer (2) was then placed in a die of quadrangular prism shape measuring 18.4 mm×20.3 mm, and the same zirconia powder used for body layer (3) and intermediate layer (2) was laid around the pre-formed body of body layer (3) and intermediate layer (2) with pigments in such an amount that the enamel layer (1) has a height of 14 mm after pressing. The pigments were used in the amounts shown in Table 1. Thereafter, the zirconia powder was subjected to main pressing at 30 kN, and fabricated into a mill blank portion by cold isostatic pressing (CIP) performed at 170 MPa for 1 minute. The mill blank portion was then fired at 1,025° C. for 2 hours to produce a mill blank portion comprising a zirconia pre-sintered body, using a firing furnace Noritake KATANA® F-1 manufactured by SK medical electronics Co., Ltd.

The following describes a method of fabrication of a zirconia sintered body frame. A molding material, or an impression material as it is also called, was used to take a negative imprint of an abutment tooth and its opposing tooth and surrounding dentition. A plaster was poured into the imprint to fabricate a positive plaster cast, in order to reproduce the abutment tooth and its opposing tooth and surrounding dentition. Thereafter, a wax was used to form a wax crown on the abutment tooth of the plaster cast, with adjusted occlusion, shape, and dimensions. The wax crown serves as the base of frame formation. This was followed by taking an optical scan of the abutment tooth and wax crown of the plaster cast with a KATANA® dental scanner D750 (manufactured by Kuraray Noritake Dental Inc.) to obtain three-dimensional digital data of the abutment tooth and wax crown. Instead of taking an optical scan of the plaster cast as in this example, an intraoral scanner may be used to directly take an intraoral optical scan.

Instead of using a wax crown, three-dimensional data based on a virtual frame shape may be created using three-dimensional CAD software after taking an optical scan of the plaster cast.

By using the three-dimensional data, the mill blank portion comprising a zirconia pre-sintered body was shaped into a front tooth frame with carbide drills (Ø=2.0 mm, Ø=0.8 mm), using a milling machine DWX-50N manufactured by Kuraray Noritake Dental Inc. The mill blank portion was then sintered at 1,550° C. for 2 hours to produce a front tooth frame comprising a zirconia sintered body, using a firing furnace Noritake KATANA® F-1 manufactured by SK medical electronics Co., Ltd.

The excess materials on surfaces of the front tooth frame were removed with an electric machining tool coupled to diamond abrasive grains with a shaft. This was followed by sandblasting of the front tooth frame with 50 µm alumina under 0.2 MPa pressure to provide matte surfaces. The surfaces of the front tooth frame were then polished to gloss with PearlSurface® (manufactured by Kuraray Noritake Dental Inc.) to obtain a dental prosthesis of the present invention.

Example 2

A mill blank portion was fabricated, and a dental prosthesis of the present invention was obtained in the same manner as in Example 1, except that the pigments used for the fabrication of the layers were used in the amounts shown in Table 1.

Comparative Example 1

A commercially available zirconia disc UTML A3 (Noritake KATANA® Zirconia, manufactured by Kuraray Noritake Dental Inc.; measuring 98.5 mm×14.0 mm) was prepared as a raw material of a frame. This product has a multilayer structure with four parallel layers, and, unlike the body layer (3), the side face does not have a portion perpendicular to the bottom face. By using the three-dimensional data obtained in Example 1, the zirconia disc was shaped into a frame with carbide drills (Ø=2.0 mm, Ø=0.8 mm), using a milling machine DWX-50N manufactured by Kuraray Noritake Dental Inc. The frame, as a precursor, was then sintered at 1,550° C. for 2 hours to produce a front tooth frame, using a firing furnace Noritake KATANA® F-1 manufactured by SK medical electronics Co., Ltd.

The excess materials on surfaces of the front tooth frame were removed with an electric machining tool coupled to diamond abrasive grains with a shaft. This was followed by sandblasting of the front tooth frame with 50 μm alumina under 0.2 MPa pressure to provide matte surfaces. The surfaces of the front tooth frame were then polished to gloss with PearlSurface® (manufactured by Kuraray Noritake Dental Inc.) to obtain a dental prosthesis.

Measurement of Shade

For the measurement of shade, the zirconia powder used for each layer of the dental prostheses fabricated in Examples and Comparative Example was used by itself to fabricate a monolayer zirconia sintered body, and the zirconia sintered body was worked into a circular disc measuring 14 mm in diameter and 1.2 mm in thickness (the both surfaces were polished with #600 paper). The disc was then measured for chromaticity in line with the $L^*a^*b^*$ color system (JIS Z 8781-4:2013 Color Measurements—Section 4: CIE 1976 $L^*a^*b^*$ color space), using a spectrophotometer CM-3610A manufactured by Konica Minolta Inc. (D65 illuminant, measurement mode: SCI, measurement area Ø:illumination area Ø=8 mm:11 mm, against white background).

Measurement of Translucency

For the measurement of translucency, the zirconia powder used for each layer of the dental prostheses fabricated in Examples and Comparative Example was used by itself to fabricate a monolayer zirconia sintered body, and the zirconia sintered body was worked into a circular disc measuring 14 mm in diameter and 1.2 mm in thickness (the both surfaces were polished with #2000 paper). A translucency was calculated from $L^*$ values of lightness (color space) of the $L^*a^*b^*$ color system (JIS Z 8781-4:2013) measured with D65 illuminant using a spectrophotometer CM-3610A manufactured by Konica Minolta Inc., as follows. The specimen was measured for first $L^*$ value—an $L^*$ value measured against a white background, and second $L^*$ value—an $L^*$ value measured for the same specimen against a black background, and the value ($\Delta L^*$) obtained by subtracting the second $L^*$ value from the first $L^*$ value was calculated as a value indicative of translucency.

TABLE 1

| | | Pigment content [1] (mass %) | | | | Shade | | | Translucency |
|---|---|---|---|---|---|---|---|---|---|
| | | NiO | V—Zr | $Cr_2O_3$ | $Al_2O_3$ | $L^*$ | $a^*$ | $b^*$ | $\Delta L^*$ |
| Example 1 | Enamel layer | 0.009 | 0.014 | 0.0004 | 0.0 | 70.85 | −1.25 | 14.20 | 10 |
| | Intermediate layer | 0.014 | 0.020 | 0.0 | 0.0 | 72.11 | −0.46 | 19.95 | 7 |
| | Body layer | 0.023 | 0.035 | 0.0 | 0.5 | 71.48 | 0.35 | 23.67 | 5 |
| Example 2 | Enamel layer | 0.011 | 0.018 | 0.0005 | 0.0 | 66.78 | −1.11 | 14.01 | 9 |
| | Intermediate layer | 0.018 | 0.027 | 0.0 | 0.0 | 70.55 | 0.66 | 21.01 | 6 |
| | Body layer | 0.029 | 0.045 | 0.0 | 0.5 | 69.92 | 1.34 | 24.65 | 4 |
| Comparative Example 1 | Enamel layer | — | — | — | — | 80.60 | 0.30 | 25.79 | 10 |
| | Intermediate layer 1 | — | — | — | — | 81.23 | 1.58 | 26.44 | 7 |
| | Intermediate layer 2 | — | — | — | — | 80.23 | 1.65 | 27.50 | 6 |
| | Body layer | — | — | — | — | 79.71 | 1.85 | 28.06 | 5 |

[1] The content of each pigment relative to the total amount of zirconia powder and all pigments. The pigment content was not measured for the commercially available disc of Comparative Example 1.

Evaluations by visual inspection confirmed that, because of the shape similar to the layer structure of a natural tooth, the front tooth frames fabricated from the dental prostheses of Examples 1 and 2 had an appearance close to a natural tooth, and had more excellent aesthetics than the frame of Comparative Example 1 having a multilayer structure with four parallel layers.

INDUSTRIAL APPLICABILITY

A mill blank of the present invention can be used as a dental prosthesis of high aesthetic quality.

REFERENCE SIGNS LIST

1 Enamel layer
2 Intermediate layer
3 Body layer
4 First imaginary cutting layer
5 Second imaginary cutting layer
6 Shoulder portion

The invention claimed is:

1. A mill blank for dental use comprising:
  a mill blank portion having a multilayer structure with two or more layers,
  wherein the multilayer structure comprises a body layer inside an enamel layer,
  the body layer is shaped to comprise a bottom face and a side face, wherein the side face has a portion perpendicular to the bottom face, and
  the body layer is shaped so that at least one cross section perpendicular to the bottom face has a shell shape.

2. The mill blank according to claim 1, wherein the mill blank portion has a quadrangular prism shape.

3. The mill blank according to claim 1, wherein the body layer is shaped so that at least one cross section parallel to the bottom face has an outline that is a combination of at least two selected from the group consisting of an arc, an ellipsoidal arc, a parabola, and a catenary.

4. The mill blank according to claim 1, wherein the body layer is shaped so that at least one cross section perpendicular to the bottom face has a protruding shape.

5. The mill blank according to claim 1, wherein the mill blank portion comprises at least one intermediate layer between the enamel layer and the body layer.

6. The mill blank according to claim 5, wherein said at least one intermediate layer has chromaticity with $L^*$=62 to 86, $a^*$=−2 to 7, and $b^*$=4 to 27 in the $L^*a^*b^*$ color system, and a translucency of $\Delta L^*$ of 4 to 18.

7. The mill blank according to claim 5, wherein said at least one intermediate layer is shaped to comprise a bottom face and a side face, and the side face has a portion perpendicular to the bottom face.

8. The mill blank according to claim 7, wherein said at least one intermediate layer is shaped so that at least one cross section parallel to the bottom face of said at least one intermediate layer has a cross sectional shape that is a combination of at least two selected from the group consisting of an arc, an ellipsoidal arc, a parabola, and a catenary.

9. The mill blank according to claim 7, wherein said at least one intermediate layer is shaped so that at least one cross section perpendicular to the bottom face of said at least one intermediate layer has a shell shape.

10. The mill blank according to claim 7, wherein said at least one intermediate layer is shaped so that at least one cross section perpendicular to the bottom face of said at least one intermediate layer has a protruding shape.

11. The mill blank according to claim 1, wherein adjacent layers in the multilayer structure have different shades and/or translucencies.

12. The mill blank according to claim 1, wherein the body layer has chromaticity with $L^*$=60 to 85, $a^*$=−2 to 7, and $b^*$=4 to 28 in the $L^*a^*b^*$ color system, and a translucency of $\Delta L^*$ of 2 to 13.

13. The mill blank according to claim 1, wherein the enamel layer has chromaticity with $L^*$=62 to 90, $a^*$=−3 to 5, and $b^*$=3 to 22 in the $L^*a^*b^*$ color system, and a translucency of $\Delta L^*$ of 4 to 20.

14. The mill blank according to claim 1, wherein the mill blank portion comprises a zirconia pre-sintered body.

15. The mill blank according to claim 14, wherein the zirconia pre-sintered body is essentially free of monoclinic crystals.

16. The mill blank according to claim 14, wherein the zirconia pre-sintered body comprises a stabilizer comprising yttria.

17. The mill blank according to claim 1, wherein a difference between the translucency $\Delta L^*$ of the enamel layer and the translucency $\Delta L^*$ of the body layer is 3 to 7.

18. The mill blank according to claim 1, wherein a difference between the translucency $\Delta L^*$ of enamel layer and the translucency $\Delta L^*$ of intermediate layer is preferably 3 to 7.

19. The mill blank according to claim 1, wherein a difference between the translucency $\Delta L^*$ of intermediate layer and the translucency $\Delta L^*$ of body layer is 3 to 7.

20. The mill blank according to claim 1, wherein the body layer is shaped so that at least two cross sections perpendicular to the bottom face have a shell shape, and wherein the at least two cross sections are perpendicular to one another.

* * * * *